US006263047B1

(12) United States Patent
Randle et al.

(10) Patent No.: US 6,263,047 B1
(45) Date of Patent: Jul. 17, 2001

(54) APPARATUS AND METHOD FOR CHARACTERIZING THE LOADING PATTERN OF A TELECOMMUNICATIONS TRANSMISSION LINE

(75) Inventors: William C. Randle, Bend; Ronald J. Larrick, Beaverton; Phillip F. Kochan, Bend, all of OR (US)

(73) Assignee: Tempo Research Corporation, Vista, CA (US)

( * ) Notice: Subject to any disclaimer, the term of this patent is extended or adjusted under 35 U.S.C. 154(b) by 0 days.

(21) Appl. No.: 09/392,669

(22) Filed: Sep. 7, 1999

(51) Int. Cl.[7] .................................................. H04M 3/08
(52) U.S. Cl. ............................. 379/26; 379/30; 379/31; 324/533
(58) Field of Search .......................... 379/6, 22, 24, 379/26, 27, 29, 30, 31; 324/522, 523, 533

(56) References Cited

U.S. PATENT DOCUMENTS

| 4,087,656 | 5/1978 | Blum et al. . |
| 4,087,657 | 5/1978 | Peoples . |
| 4,307,267 | 12/1981 | Peoples . |
| 5,404,388 | 4/1995 | Eu . |
| 5,881,130 | * 3/1999 | Zhang ...................................... 379/6 |
| 6,026,145 | * 2/2000 | Bauer et al. ............................ 379/26 |
| 6,091,713 | * 7/2000 | Lechleider et al. .................... 379/27 |
| 6,144,721 | * 11/2000 | Stephens ................................ 379/21 |

* cited by examiner

Primary Examiner—Stella Woo
Assistant Examiner—Barry W Taylor
(74) Attorney, Agent, or Firm—Pillsbury Winthrop LLP

(57) ABSTRACT

An apparatus and method for characterizing a loading pattern of a twisted pair telecommunications transmission line includes a variable frequency signal generator and a measurement receiver connected to the twisted pair line. The signal generator applies a variable frequency signal to the twisted pair line and the measurement receiver acquires magnitude values representative of the impedance of the twisted pair line. A controller, operating under program control, models a plurality of baseline transmission line and twisted pair lines to generate magnitude values representative of the models. Error values are generated between the acquired magnitude values and the modeled magnitude values. The error values are compared to each other to determine the model with the minimum error value which is used as the model for charactering the twisted pair transmission line.

32 Claims, 8 Drawing Sheets

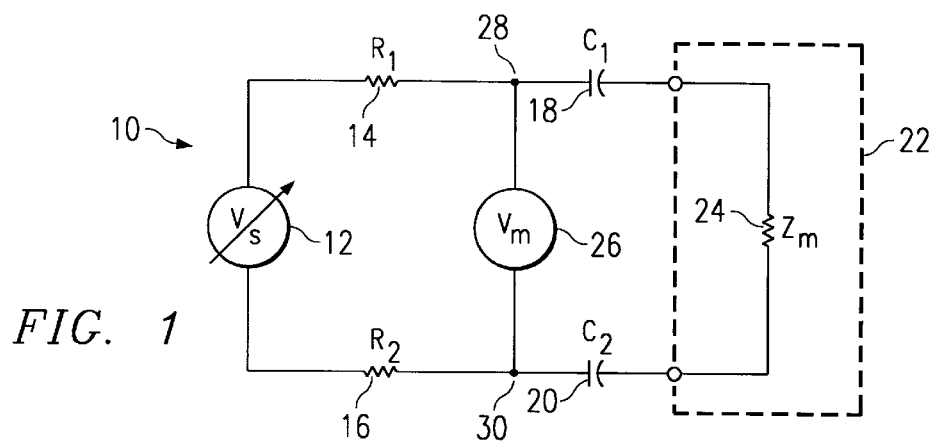
FIG. 1
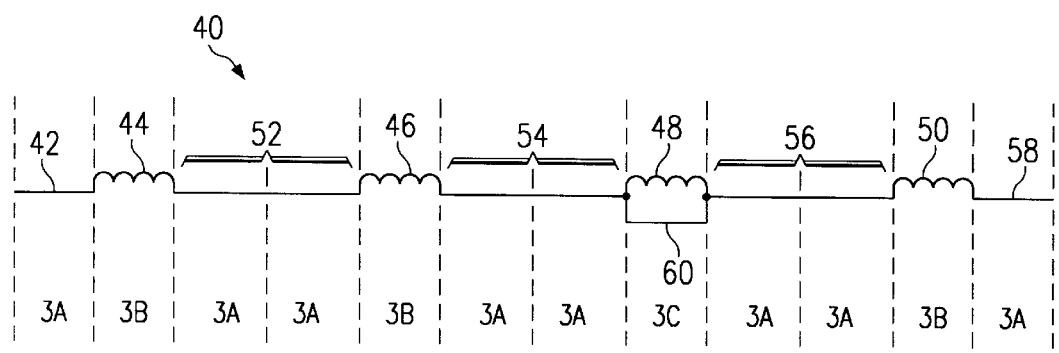
FIG. 2
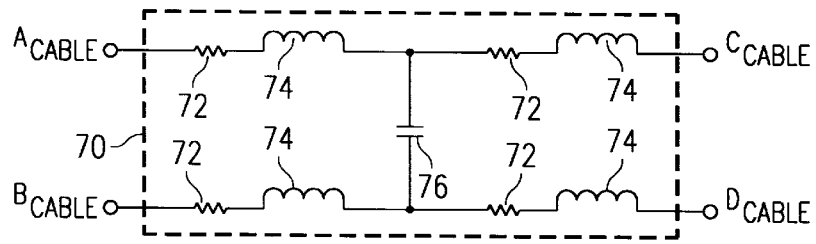
FIG. 3A
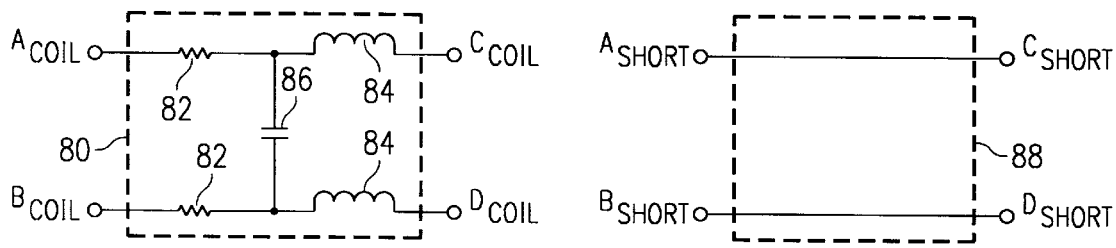
FIG. 3B
FIG. 3C

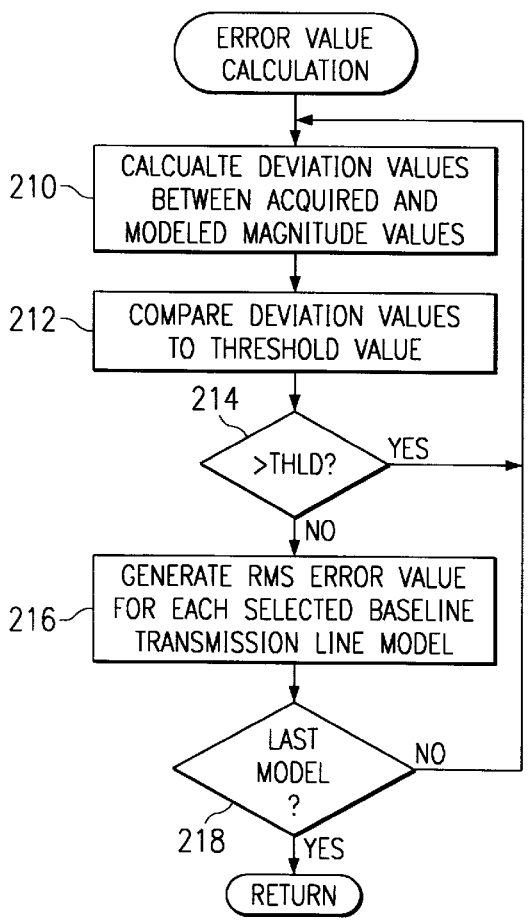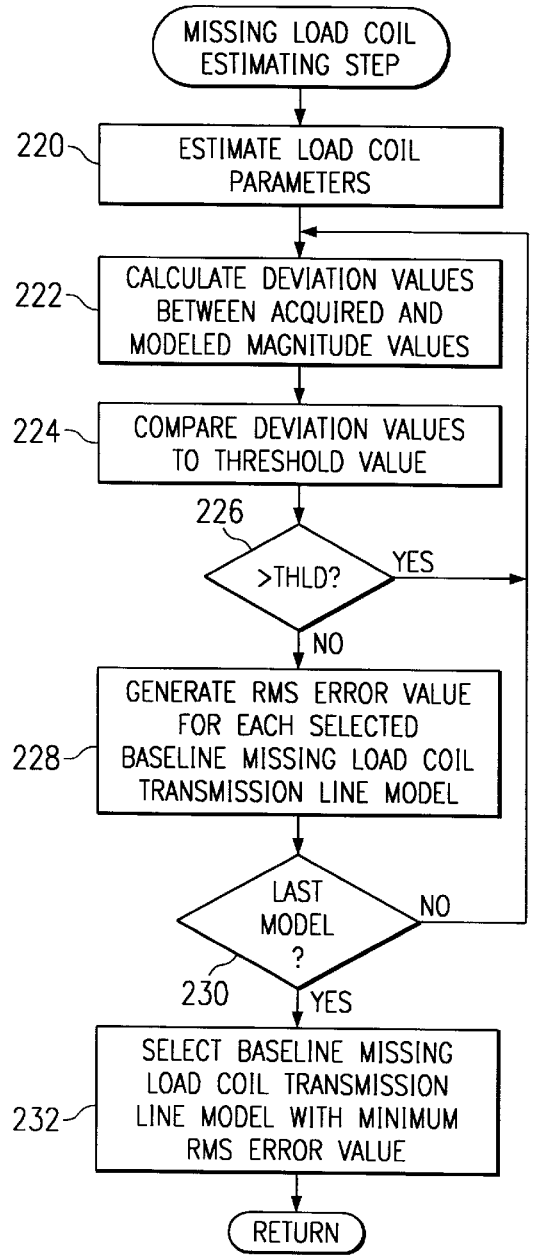

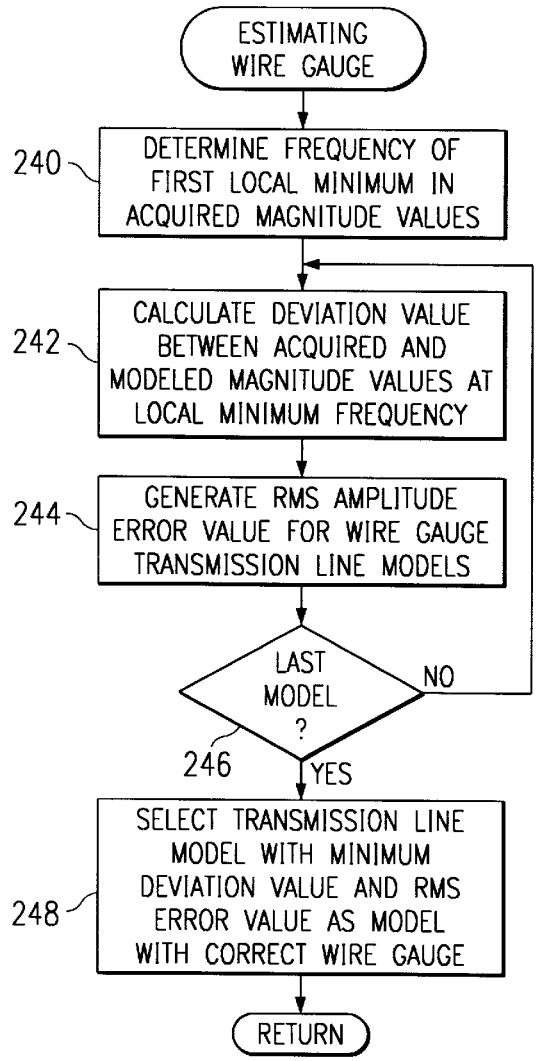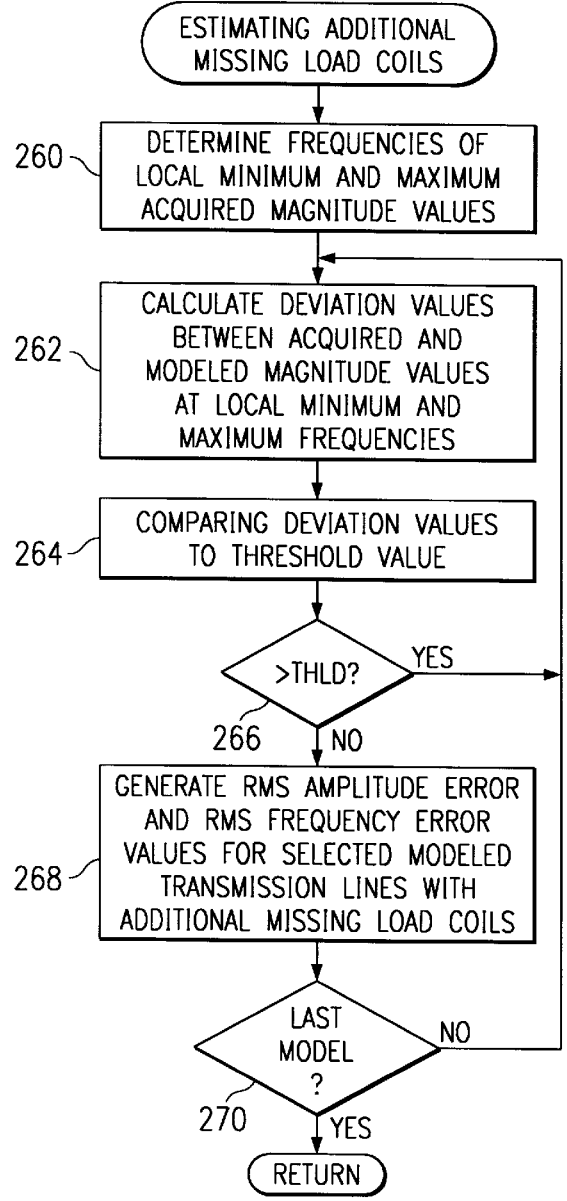

APPARATUS AND METHOD FOR CHARACTERIZING THE LOADING PATTERN OF A TELECOMMUNICATIONS TRANSMISSION LINE

BACKGROUND OF THE INVENTION

The present invention relates generally to measuring the characteristics of a telephone cable and more specifically to determining the number and location of load coils in a telephone line using the impedance characteristics of the telephone line.

Traditional voice telephony uses load coils on very long twisted-pair lines to improve the frequency response of the lines. The most common loading pattern uses 88 mH coils with a nominal spacing between the coils of 6,000 feet and 3,000 feet at each end. In situations where one or more load coils are missing or shorted, due to improper removal, lightening strikes, and the like, it becomes important for a technician to easily determine the missing or malfunctioning load coil(s) in the line to minimize service time.

Traditional methods of locating missing load coils include long pulse TDR and network synthesis. The long pulse TDR method uses a time domain reflectometer that launches long pulses into a twisted-pair line and generates waveform data that is displayed as a magnitude versus distance waveform trace on a display device, such as a cathode-ray-tube or liquid crystal display. Long pulses are used because the bandwidth of the twisted-pair line is in the range of 4.5 kHz. Because the pulsewidths of the launched pulses are greater than the spacing between the load coils, it is difficult for a user to determine the existence and location of load coils in the line. Load coils appear on the waveform trace as subtle changes in the slope of the trace. Accurately identifying the subtle changes and where they start, especially in the presence of noise, is very difficult, even for an experienced technician.

The network synthesis method measures the magnitude versus frequency response of the line to try and extract the pole and zero frequencies of the input immittance of the line. Using classical network synthesis equations on the pole and zero frequencies, and assuming the line resistance is zero, a first Cauer L-C ladder network is synthesized to approximate the loaded line. Letting the L values represent the load coil inductance and C to represent the length of the line between each load coil, the network synthesis method provides the needed information when the pole and zero frequencies are measured accurately. U.S. Pat. Nos. 4,087,656 and 4,087,657 respectively describes acquiring immittance magnitude values and immittance magnitude and phase values as the frequency of an input signal is swept and looking for peaks and valleys in the data to estimate the pole and zero frequencies. A ladder network is synthesized corresponding to the estimated poles and zeros. Once the ladder network is synthesized, any missing elements can be determined and related back to the causal missing load coil. The main disadvantages of this method include computational complexity, the need for specialized phase measurement circuitry when the phase is measured, and the difficulty of locating pole and zero frequencies when the cable has resistance.

A further method described in the Background of the Invention of the 656 patent employs a piece of test equipment that includes a cathode ray tube for displaying a pattern representing, as a function of frequency, the impedance characteristics of the line under test. At the same time, the tube displays a second pattern which represents, as a function of frequency, the impedance characteristics of a lattice network. This network is made up by the test equipment operator from a kit to cause the second pattern to approximate that of the line under test. When a good match between the two patterns is achieved, then the configuration and values of the network elements are indicative of the composition of the line under test. The patent states that although the equipment had been used successfully, it was found that producing a reasonable match of patterns was time consuming and somewhat of an art.

What is needed is an apparatus and method for determining the number of load coils that should be present in a properly loaded telephone line and positionally detects which, if any, load coil(s) are missing. Such an apparatus and method should be portable, easy to use, and sufficiently fast to allow field technicians to quickly locate missing or malfunctioning load coil(s) and effect repairs.

SUMMARY OF THE INVENTION

Accordingly, the present invention is an apparatus and method for characterizing the loading pattern of a telecommunications transmission line. The apparatus has a signal generator and a measurement receiver coupled to the telecommunications transmission line. The signal generator produces a variable frequency output signal that is coupled into the transmission line. In the preferred embodiment, the telecommunications transmission line is a twisted pair line. The measurement receiver generates magnitude values representative of the impedance of the transmission line as a function of the signal generator output frequency. A modeling means generates magnitude values representative of the impedance of modeled telecommunications transmission lines as a function of frequency. An error value calculating means produces an error value for each of the modeled telecommunications transmission lines by comparing the acquired magnitude values with the modeled magnitude values. Means are provided for comparing the error values of the modeled telecommunications transmission lines to each other to determine the modeled telecommunications transmission line with the minimum error value that characterizes the loading pattern of the measured telecommunications transmission line.

In the preferred embodiment of the invention, means are provided for normalizing the acquired magnitude values by the magnitude value of the variable frequency output signal. The modeling further includes a means for modeling a plurality of telecommunications transmission lines and a plurality of baseline telecommunications transmission lines to generate magnitude values representative of the impedance of the modeled and baseline telecommunications transmission lines as a function of frequency. The error value calculating means further includes means for calculating an error value for each of the modeled and baseline telecommunications transmission lines by comparing the acquired magnitude values with the modeled and baseline magnitude values. Means are provided for estimating a wire gauge for the telecommunications transmission line using the baseline telecommunications transmission lines with the minimum error value. An estimating means estimates a first missing load coil in the telecommunications transmission line by modeling baseline transmission lines with a missing load coil at various locations in the baseline transmission line using the estimated wire gauge. The modeled baseline transmission line with the minimum error value is used as the model for the location of the first missing load coil. Means are also provided for estimating additional missing load coils in the telecommunications transmission line using the modeled telecommunications transmission lines at the estimated wire gauge and the estimated location of the first missing load coil. The error value comparing means further includes means for comparing the error values of the modeled telecommunications transmission lines with the estimated additional load coils to each other to determine the modeled telecommunications transmission line with the minimum error value that characterizes the loading pattern of the measured telecommunications transmission line.

The error value calculating means further includes means for generating an RMS error value for each of the modeled and baseline telecommunications transmission lines using ratio values derived from the acquired magnitude values divided by the magnitude values of the respective modeled and baseline telecommunications transmission lines at common frequency values. A comparing means compares the ratio values of the respectively modeled baseline telecommunications transmission lines to a threshold value to select modeled baseline telecommunications transmission lines that may characterize the loading pattern of the measured telecommunications transmission line. Alternately, the calculating means may include means for generating an average difference error value for each of the modeled and baseline telecommunications transmission lines using difference values derived by the difference between the acquired magnitude values and the magnitude values of the modeled and the baseline telecommunications transmission lines at common frequency values. The apparatus for characterizing the loading pattern of a telecommunications transmission line may also include an additional comparing means that compares the difference values of the respectively modeled telecommunications transmission lines to a threshold value to select modeled telecommunications transmission lines that may characterize the loading pattern of the measured telecommunications transmission line.

The normalizing means, the modeling means, the calculating means, the various estimating means and the comparing means further comprise a controller executing instructions stored in a memory device. The memory device further contains coefficients of a plurality of two-port transmission line network models at selected frequencies and wire gauges representing segments of the telecommunications transmission line and baseline telecommunications transmission lines. The coefficients of the plurality of two-port transmission line networks representing the baseline telecommunications transmission line at various wire gauges have a plurality of load coils with the plurality of load coils being in the range of thirty-six load coils.

The method of characterizing the loading pattern of a telecommunications transmission line includes the steps of applying a variable frequency signal to the telecommunications transmission line and acquiring magnitude values representative of the impedance of the telecommunications transmission line as a function of the variable frequency signal. A plurality of telecommunications transmission lines are modeled to generate magnitude values representative of the impedance of the modeled telecommunications transmission lines as a function of frequency. An error value for each of the modeled telecommunications transmission lines is calculated by comparing the acquired magnitude values with the modeled magnitude values. The error values of the modeled telecommunications transmission lines are compared to each other to determine the modeled telecommunications transmission line with the minimum error value that characterizes the loading pattern of the measured telecommunications transmission line. The method also includes an initial step of storing coefficients of two-port transmission line network models that represents segments of the telecommunications transmission line.

The modeling step includes the steps of concatenating multiple two-port transmission line model segments to generate coefficients that model a plurality of sections of the telecommunications transmission line and concatenating multiple two-port transmission line model sections to generate coefficients that model a plurality of telecommunication transmission lines. Additional modeling steps include generating impedance values as a function of frequency using the plurality of two port transmission line network models and generating magnitude values representative of the impedance of the modeled telecommunications transmission lines as a function of the generated impedance values. Additional coefficients of two-port transmission line network models may be stored that represents sections of the telecommunications transmission line at selected frequencies and transmission line wire gauges. Multiple two-port transmission line model sections are concatenated to generate coefficients that model a plurality of telecommunication transmission lines prior to the generating the impedance and magnitude values representative of the impedance of the modeled telecommunications transmission lines.

In the preferred method of characterizing the loading pattern of a telecommunications transmission line, the magnitude value acquiring step further includes the step of normalizing the acquired magnitude values using the magnitude of the variable frequency signal. The modeling step also includes the steps of estimating a beginning length for the transmission line as a function of the acquired magnitude value at the moderately high acquired frequency, and estimating a length for the transmission line as a function of the acquired magnitude value at the lowest acquired frequency. From the estimated length of the transmission line, a load coil count for the transmission line is estimated that represents the number of load coils in the transmission line. A further step is to model a plurality of baseline telecommunications transmission lines to generate magnitude values representative of the impedance of the baseline telecommunications transmission lines as a function of frequency. An error value is calculated for each of the baseline telecommunications transmission lines by comparing tile acquired magnitude values with the baseline magnitude values. A wire gauge is estimated for the telecommunications transmission line using the baseline telecommunications transmission line having the minimum error value. A first missing load coil in the telecommunications transmission line is estimated by modeling baseline transmission lines with a missing load coil at various locations in the baseline telecommunications transmission line at the estimated wire gauge and using the baseline missing load coil transmission line model with the minimum error value.

A plurality of telecommunications transmission lines using the estimated wire gauge and the estimated location of the first missing load coil are modeled to generate magnitude values representative of the impedance of the modeled telecommunications transmission lines as a function of frequency. The wire gauge is re-estimated by calculating a difference value between a first local minimum magnitude value in the acquired magnitude values and the corresponding magnitude value for each of the modeled telecommunications transmission lines and using the modeled telecommunications transmission line with the minimum difference value. Additional missing load coils in the telecommunications transmission line are estimated using the modeled telecommunications transmission lines at the estimated wire gauge and the estimated location of the first missing load coil to generate amplitude and frequency error values. The error values of the modeled telecommunications transmission lines with the estimated additional missing load coils are compared to each other to determine the modeled telecommunications transmission line with the minimum error value that characterizes the loading pattern of the measured telecommunications transmission line.

The baseline transmission line modeling step further includes the steps of generating impedance values as a function of frequency using the plurality of two port transmission line network models, and generating magnitude values representative of the impedance of the baseline telecommunications transmission lines as a function of the generated impedance values. The baseline transmission line error value calculating step includes the steps of calculating deviation values between the acquired magnitude values and the baseline magnitude values for each of the modeled baseline telecommunications transmission lines. The deviation value calculating step further includes the step of normalizing the acquired magnitude values by the magnitude values of the respective baseline telecommunications transmission lines at common frequency values. Alternately, the deviation value calculating step may include the step of determining the difference between the acquired magnitude values and the magnitude values of the respective baseline telecommunications transmission lines at common frequency values. The baseline transmission line error value calculating step also includes comparing the deviation values to a threshold value to select baseline telecommunications transmission lines that may represent a correct wire gauge for the telecommunications transmission line, and generating an RMS error value for each of the selected baseline telecommunications transmission lines using averaged normalized ratio values derived from the acquired magnitude values divided by the magnitude values of the respective baseline telecommunications transmission lines at common frequency values.

The first missing load coil estimating step further includes the steps of establishing load coil parameters for the first missing load coil position using the respective beginning length of the telecommunications transmission line and the load coil count. Deviation values are calculated between the acquired magnitude values and the baseline magnitude values for each of the modeled baseline missing load coil telecommunications transmission lines within the load coil parameters. The deviation values are compared to a threshold value to select baseline missing load coil telecommunications transmission lines that may represent the correct location of the missing load coil. An RMS error value is generated for each of the selected baseline missing load coil telecommunications transmission lines using averaged normalized ratio values derived from the acquired magnitude values divided by the magnitude values of the respective baseline missing load coil telecommunications transmission lines at common frequency values, and the baseline missing load coil telecommunications transmission line model with the minimum RMS error is selected as representing the location of the first missing load coil.

The first missing load coil estimating steps are repeated for various wire gauge models for selecting the baseline missing load coil telecommunications transmission line model with the minimum RMS error as having the correct wire gauge.

The telecommunications transmission line modeling step includes the steps of concatenating multiple two-port transmission line model segments to generate coefficients that model a plurality of sections of the telecommunications transmission line and concatenating multiple two-port transmission line model sections to generate coefficients that model a plurality of telecommunication transmission lines. Impedance values are generated as a function of frequency using the plurality of two port transmission line network models, and magnitude values are generated representative of the impedance of the modeled telecommunications transmission lines as a function of the generated impedance values.

The wire gauge is re-estimated using the telecommunications transmission line model with the estimated first missing load coil. The steps for re-estimating the wire gauge further include determining a frequency of a first local minimum value in the acquired magnitude values and calculating deviation values between the acquired magnitude value at the local minimum frequency and the corresponding magnitude value for each of the modeled telecommunications transmission lines at the various gauges. An RMS amplitude error value is generated for each of the modeled telecommunications transmission lines using averaged normalized ratio values derived from the acquired magnitude values divided by the magnitude values of the respective modeled telecommunications transmission lines at common frequency values. The telecommunications transmission line model with the minimum first local minimum deviation values and RMS amplitude error values is selected as having the correct wire gauge.

The step of estimating additional missing load coils includes the steps of determining frequencies of local minimum and maximum magnitude value in the acquired magnitude values, calculating deviation values between the magnitude values in the acquired magnitude values at the local minimum and maximum frequencies and the corresponding magnitude value for each of the modeled telecommunications transmission lines and comparing the deviation values to a threshold value to select the modeled telecommunications transmission lines that may represent the correct modeled transmission line with additional missing load coils. An RMS amplitude error value is generated for each of the modeled telecommunications transmission lines using averaged normalized ratio values derived from the acquired magnitude values divided by the magnitude values of the respective modeled telecommunications transmission lines at common frequency values. An RMS frequency error value is also generated for each of the telecommunications transmission lines using averaged normalized ratio values derived from the frequency difference between the local minimum and maximum acquired magnitude values and corresponding minimum and maximum magnitude values of the modeled telecommunications transmission lines. The first local minimum deviation values, RMS amplitude and RMS frequency error values of the modeled telecommunications transmission lines with the estimated additional missing load coils are compared to each other to determine the modeled telecommunications transmission line with the minimum first local minimum difference value, RMS amplitude and RMS frequency value that characterizes the loading pattern of the measured telecommunications transmission line.

The deviation value calculating step associated with the estimation of additional missing load coils also includes the step of normalizing the local minimum and maximum acquired magnitude values by the corresponding magnitude values of the respective telecommunications transmission lines at common frequency values. Alternately, the deviation value calculating step may be performed by determining the difference between the local minimum and maximum acquired magnitude values and the corresponding magnitude values of the respective modeled telecommunications transmission lines at common frequency values.

The objects, advantages and novel features of the present invention are apparent from the following detailed description when read in conjunction with appended claims and attached drawings.

BRIEF DESCRIPTION OF THE DRAWINGS

FIG. 1 is a simplified schematic representation of an acquisition circuit for generating voltage values representative of the impedance of a telecommunications transmission line used in the apparatus for characterizing the loading pattern of a telecommunications transmission line according to the present invention.

FIG. 2 is a representation of a twisted pair telephone line implementing the H88 loading coil pattern that is characterized using the apparatus for characterizing the loading pattern of a telecommunications transmission line according to the present invention.

FIGS. 3A, 3B and 3C respectively illustrate modeled segments of a 3,000 foot section of a twisted pair transmission line, an 88 mH load coil, and a shorted or missing load coil that are used in the apparatus for characterizing the loading pattern of a telecommunications transmission line according to the present invention.

FIG. 9 is a flow chart illustrating the steps in generating an RMS error value in the method for characterizing the loading pattern of a telecommunications transmission line according to the present invention.

FIG. 10 is a flow chart illustrating the step in estimating a first missing load coil in the method for characterizing the loading pattern of a telecommunications transmission line according to the present invention.

FIG. 11 is a flow chart illustrating the steps in estimating the wire gauge of the transmission line under test in the method for characterizing the loading pattern of a telecommunications transmission line according to the present invention.

FIG. 13 is a flow chart illustrating the steps in estimating additional missing load coils in the method for characterizing the loading pattern of a telecommunications transmission line according to the present invention.

DETAILED DESCRIPTION OF THE PREFERRED EMBODIMENT

Figure 4:
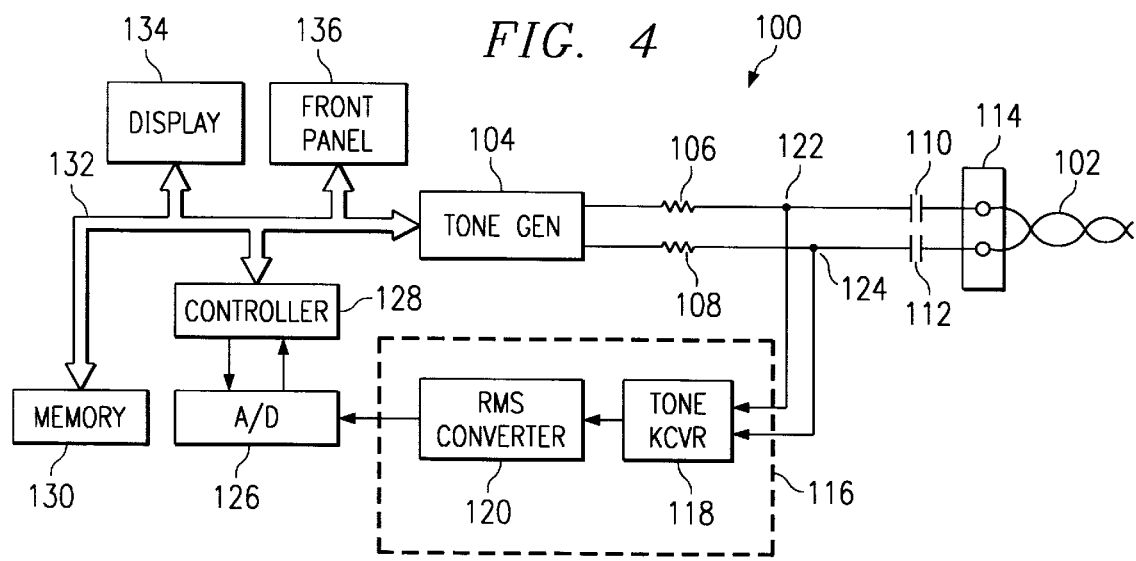
FIG. 4 is a block diagram of the apparatus for characterizing the loading pattern of a telecommunications transmission line according to the present invention.

In the following detailed description numerous specific details are set forth in order to provide a thorough understanding of the present invention. However, it will be understood by those skilled in the art that the present invention may be practiced without the specific details. In other instances well known methods, procedures, components, and circuits have not been described in detail so as not to obscure the present invention.

Parts of the description will be presented in terms of operations performed by a computer system, using terms such as data, values, numbers and the like, consistent with the manner commonly employed by those skilled in the art to convey the substance of their work to others skilled in the art. As is well understood by those skilled in the art, these quantities take the form of electrical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentations.

Referring to FIG. 1, there is shown a simplified schematic representation of the acquisition circuit 10 that generates magnitude values, such as voltages, representative of the impedance of a telecommunications transmission fine. The apparatus has a signal generator 12 producing a variable frequency output signal. The output signal is coupled through resistors 14 and 16 and capacitors 18 and 20 to the telecommunications transmission line 22 represented by complex impedance 24. The acquisition circuit 10 and transmission line 22 combination is equivalent to a voltage divider network with the signal generator 12 acting as the voltage source and the resistors 14 and 16 and capacitors 18 and 20 in conjunction with the transmission line impedance acting as the voltage divider. A measurement receiver 26 is coupled to the junctions 28 and 30 between the resistors 14 and 16 and the transmission line impedance 24 to measure the voltage at the resistor junction nodes. The voltage at the resistor junction nodes 28 and 30 is representative of the impedance of the telecommunications transmission line 22.

In the preferred embodiment of the present invention, the telecommunications transmission line 22 is a twisted pair telephone line having load coils inserted into the line at predefined intervals The present invention is implemented for the characterization of the industry standard H88 loading pattern for twisted pair phone lines. The H88 pattern uses 88 mH coils with a nominal spacing of 6,000 feet between load coils an 3,000 feet of twisted pair line at each end. The present invention is not limited to this specific loading pattern and other loading patterns, such as the D66 loading pattern may be characterized using the apparatus and method herein described and claimed.

Referring to FIG. 2, there is shown a representation of a twisted pair telephone line 40 implementing the H88 loading coil pattern. Generally, load coils are not placed in twisted pair lines under 15,000 to 18,00 feet in length. For lines greater than 18,000 feet, the twisted pair line 40 generally starts with a nominal 3,000 feet of line 42 before the placement of the first load coil 44. Subsequent load coils 46, 48, and 50 are inserted into the twisted pair line 40 an a nominal spacing of 6,000 feet, represented by sections 52, 54 and 56. A nominal length of 3,000 feet of line 58 is provided after the last load coil. The maximum number of load coils on a line is dependent on the resistance of the line and whether range extender circuits are used in the line.

The twisted pair transmission line 40 may be divided into a number of segments as represented by the vertical dashed lines going through the line 40. Note that load coil 48 is shown as being shorted or missing by the shunt wire 60 around the coil. Each segment of the transmission line 40 may be modeled as a two-port transmission line network. In the preferred embodiment of the invention, the modeled segments are representative of a 3,000 foot section of a twisted pair transmission line, an 88 mH load coil, an a shorted or missing load coil. These segments or elements are representatively illustrated in FIGS. 3A, 3B and 3C and labeled as such in FIG. 2.

FIG. 3A illustrates an ABCD two-port transmission line network model 70 for a twisted pair line. The twisted pair line model 70 includes distributed resistance, inductance and capacitance, respectively labeled 72, 74 and 76. Typical unit length characteristics for a plastic insulated twisted pair line having 0.51 mm diameter conductors (i.e. 24 AWG wire) are listed below as:

$R_{line}$=0.165 ohms per meter
$C_{line}$=51.57×10$^{-12}$ farads per meter
$L_{line}$=6.09×1$^{-7}$ Henrys per meter
$G_{line}$=10$^{-12}$ mho per meter It is well known to those skilled in the electrical arts that the resistance, capacitance and inductance characteristics of a twisted pair line vary as a function of the diameter or gauge of the conductors and the construction of the cable and that the values listed above are representative of one particular gauge of conductor. The current installed base of twisted pair lines in the telecommunications industry has wire gauges ranging from 19 AWG to 26 AWG with some installed twisted pair lines having different wire gauges within the line. Further, the values listed for the 24 AWG twisted pair conductors are not the only values that may be used and other values given by a manufacture or chosen by the user may be used. The propagation constant for the twisted pair line is given by the equation:

$$\rho = \sqrt{(G_{line}+j\cdot 2\cdot\pi\cdot f\cdot C_{line})\cdot(R+j\cdot 2\cdot\pi\cdot f\cdot L_{line})} \quad (1)$$

The line impedance is given by the equation:

$$Z_0 = \sqrt{\frac{R_{line}+j\cdot 2\cdot\pi\cdot f\cdot L_{line}}{G_{line}+j\cdot 2\cdot\pi\cdot f\cdot C_{line}}} \quad (2)$$

The ABCD parameters for the twisted pair line segment are given by the equations:

$$A_{line} = \cos h(\rho \cdot \text{length}) \quad (3)$$

$$B_{line} = Z_0 \cdot \sin h(\rho \cdot \text{length}) \quad (4)$$

$$C_{line} = \frac{1}{Z_0} \cdot \sinh(\rho \cdot \text{length}) \quad (5)$$

$$D_{line} = \cos h(\rho \cdot \text{length}) \quad (6)$$

The matrix for the ABCD two-port transmission line network model of the twisted pair line segment is:

$$\text{Line}_{ABCD} = \begin{bmatrix} A_{line} & B_{line} \\ C_{line} & D_{line} \end{bmatrix} \quad (7)$$

FIG. 3B illustrates an ABCD two-port transmission line network model 80 for an 88 mH load coil. The load coil model 80 includes the resistance 82 of the coil, the inductance 84 of the coil and the capacitance 86 between its wires. Typical load coil characteristics are listed below as:

$L_{H88}$=88×10$^{-3}$ Henrys
$C_{H88}$=2.4×10$^{-9}$ Farads
$R_{H88}$=6 ohms

The ABCD parameters for the load coil are given by the equations:

$$A_{H88}=1 \quad (8)$$

$$B_{H88}=R_{H88}+j\cdot 2\cdot\pi\cdot f\cdot L_{H88} \quad (9)$$

$$C_{H88}=j\cdot 2\cdot\pi\cdot f\cdot C_{H88} \quad (10)$$

$$D_{H88}=1 \quad (11)$$

The matrix for the ABCD two-port transmission line network model for the load coil is:

$$\text{LoadCoil}_{ABCD} = \begin{bmatrix} A_{H88} & B_{H88} \\ C_{H88} & D_{H88} \end{bmatrix} \quad (12)$$

FIG. 3C illustrates an ABCD two-port transmission line network model for a shorted or missing load coil 88. A shorted or missing load coil is modeled as a unity matrix of two wires with no resistance defined below as:

$$A_{short}=1 \quad (13)$$

$$B_{short}=0 \quad (14)$$

$$C_{short}=0 \quad (15)$$

$$D_{short}=1 \quad (16)$$

$$\text{short}_{ABCD} = \begin{bmatrix} A_{short} & B_{short} \\ C_{short} & D_{short} \end{bmatrix} = \begin{bmatrix} 1 & 0 \\ 0 & 1 \end{bmatrix} \quad (17)$$

The above described matrices may be concatenated to model various lengths and load coil patterns of a twisted pair line. For example, a loaded line section may be modeled using the 3,000 feet twisted pair line segment matrix, the load coil matrix, and a second 3,000 feet twisted pair line segment matrix as shown below.

$$\text{LoadedSection}_{ABCD} = \begin{bmatrix} A_{line} & B_{line} \\ C_{line} & D_{line} \end{bmatrix} \cdot \begin{bmatrix} A_{H88} & B_{H88} \\ C_{H88} & D_{H88} \end{bmatrix} \cdot \quad (18)$$

$$\begin{bmatrix} A_{line} & B_{line} \\ C_{line} & D_{line} \end{bmatrix}$$

$$\text{LoadedSection}_{ABCD} = \begin{bmatrix} A_{LoadedSection} & B_{LoadedSection} \\ C_{LoadedSection} & D_{LoadedSection} \end{bmatrix} \quad (19)$$

An unloaded line section may be modeled using the 3,000 feet twisted pair line segment matrix, the shorted load coil matrix, and a second 3,000 feet twisted pair line segment matrix as shown below.

$$\text{UnloadedSection}_{ABCD} = \begin{bmatrix} A_{line} & B_{line} \\ C_{line} & D_{line} \end{bmatrix} \cdot \begin{bmatrix} A_{short} & B_{short} \\ C_{short} & D_{short} \end{bmatrix} \cdot \quad (20)$$

$$\begin{bmatrix} A_{line} & B_{line} \\ C_{line} & D_{line} \end{bmatrix}$$

$$\text{UnloadedSection}_{ABCD} = \begin{bmatrix} A_{UnloadedSection} & B_{UnloadedSection} \\ C_{UnloadedSection} & D_{UnloadedSection} \end{bmatrix} \quad (21)$$

Referring to FIG. 4, there is shown a block diagram of the preferred embodiment of the apparatus 100 for characterizing the loading pattern of a twisted pair transmission line 102. The apparatus 100 may be a portion of a POTS measurement test instrument that measures various characteristics of a standard twisted pair telephone line. The apparatus 100 includes an acquisition circuit similar to that described in FIG. 1. A tone signal generator 104 produces a variable frequency output signal that is coupled through resistors 106 and 108, blocking capacitors 110 and 112, and an instrument interface 114 to the twisted pair line 102 under test. The blocking capacitors 110 and 112 are placed in the circuit path to block DC voltages that may be present on the test line 102. Resistors 106 and 108 in combination with the impedance of the capacitors 110 and 112 and the twisted pair line 102 under test produce an equivalent voltage divider network with the tone signal generator 104 functioning as the voltage source. A measurement receiver 116 that includes a tone receiver 118 and RMS converter 120 is coupled to the node junction 122 of the resistor 106 and one of the twisted pair lines 102 and the node junction 124 of the resistor 108 and the other twisted pair line 102. The measurement receiver 116 conditions the voltages at the nodes, which represents the impedance of the twisted pair line 102 under test. An Analog-to-Digital (A/D) converter 126 receives the output of the measurement receiver 116 and converts the RMS signal to digital values representative of the measured voltage. A controller 128, operating under program, receives the digital values and stores the values in memory 130 via data and address bus 132 for subsequent processing. The memory 130 includes both read only memory (ROM) and random access memory (RAM). The ROM memory stores program instructions for controlling the operation of the apparatus 100 and precomputed parameters of ABCD matrices for various concatenated sections of modeled transmission lines with various wire gauges and at selected frequencies. The digital data representing the measured voltage is processed by the controller 128 under program control, compared with the voltage values generated using the modeled transmission line matrices, and a resultant display is output to display device 134, such as a cathode-ray-tube, liquid crystal display, or the like. Display processing may be performed by the controller 128 or by a separate display processor (not shown) coupled to receive the processed data from the controller 128. Front panel 136 is coupled via the bus 132 to the controller 128 and includes input devices, such as buttons, knobs, soft keys, and the like for setting up the apparatus 100 and initiating load coil characterization of the transmission line.

The tone generator 104 is a programmable sinewave generator integrated circuit, manufactured and sold by Micro Linear under part number ML2036 that is capable of producing sinewaves from DC to 65,535 Hz with 1.0 Hz resolution. In the preferred embodiment of the present invention, the tone generation 104 produces discrete frequency tones over a range of approximately 100 to 5000 Hz with a frequency separation between the tones being 30 Hz over ranges from 100 to 2000 Hz and 4200 to 5000 Hz and frequency separation of 50 Hz between the tones over the range from 2000 Hz to 4200 Hz. The output voltage level of the tone generator is in the range of 2.8 volts. The tone receiver 118 includes input buffer circuitry that receives the voltage signals on nodes 122 and 124. A variable gain amplifier integrated circuit, manufactured and sold by Burr Brown under part number INA1039KU receives the buffered voltage signals and amplifies the signals in gains of 1, 10 and 100. The output of the variable gain amplifier is low-pass filtered and coupled through a digitally controlled analog attenuator integrated circuit, manufactured and sold by National Semiconductor under part number LM1971. The RMS converter 120 receives the amplified and filtered voltage signal from the tone receiver 118. The RMS converter 120 is a single chip, low power, true RMS converter that is laser trimmed to provide a maximum error of ±0.2 mV ±0.3% of reading with sinewave inputs, such as manufactured by Analog Devices under part number AD737. The A/D converter 126 receives the output from the RMS converter 120 and converts the signal into digital values representative of the impedance of the twisted pair line under test 102. The A/D converter 126 is a high precision, autoranging device with a 4 ¾ digit resolution, manufactured and sold by TelCom Semiconductor, Inc. under part number TC8129. The digital output from the A/D converter 126 is passed through the controller 128, such as a MC68330PV16VA, manufactured and sold by Motorola, Inc., and stored in memory 130.

Figure 5A:
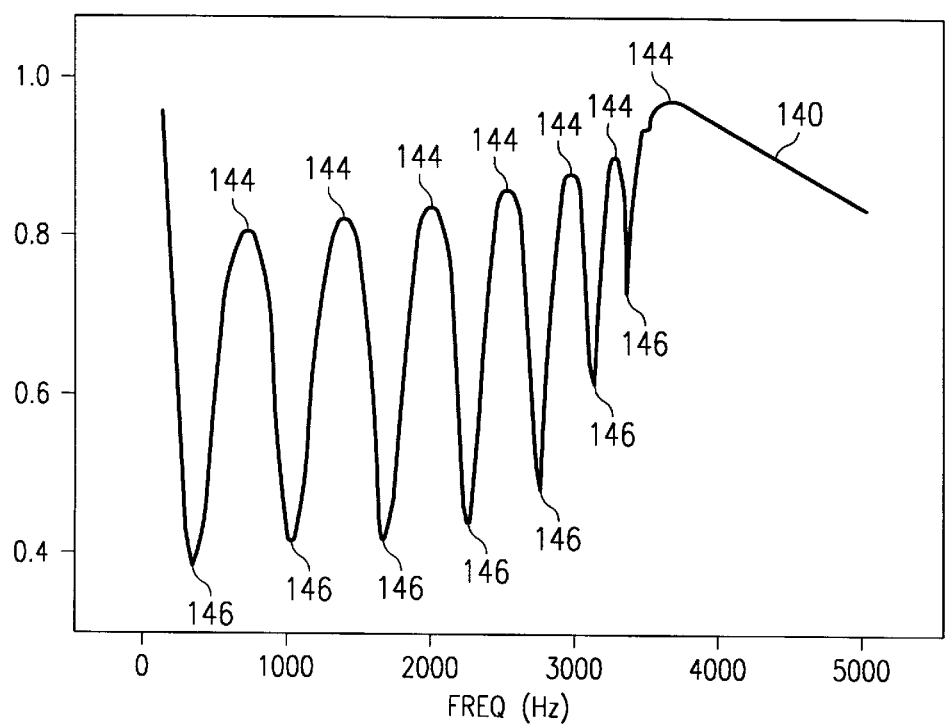
FIGS. 5A and 5B illustrate representative waveform traces of the voltage output of the, measurement receiver in the apparatus for characterizing the loading pattern of a telecommunications transmission line according to the present invention.
Figure 5B:
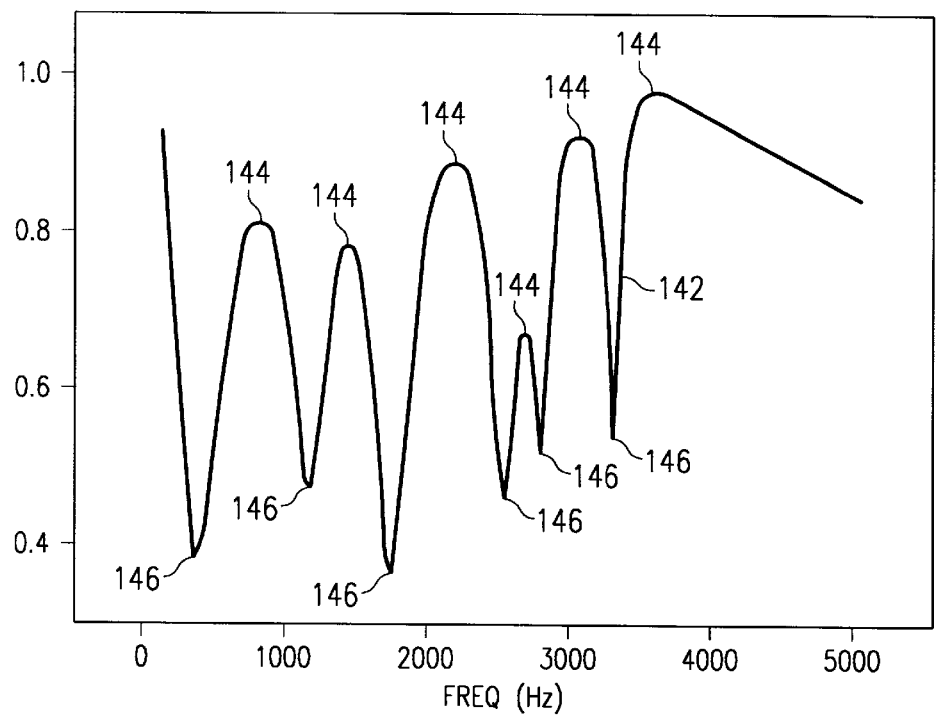

Referring to FIGS. 5A and 5B, there are shown representative waveform traces of the voltage output of the measurement receiver 116. FIG. 5A illustrates an amplitude versus frequency trace 140 for a twisted pair transmission line having 8 load coils. FIG. 5B illustrates an amplitude versus frequency trace 142 for a twisted pair transmission line having 7 load coils and 1 missing load coil. The tone generator 104 generates output signal tones at the selected frequencies intervals previously described and applies the tone outputs to the twisted pair transmission line under test 102. The measurement receiver 116 measures the voltage magnitude at nodes 122 and 124 at the selected frequencies tones and produces an output voltage signal that is representative of the impedance of the line under test 102. The output voltage from the measurement receiver 116 is converted to digital values by the A/D converter 126, stored in memory 130 and processed further by the controller 128. One of the processing steps is to normalize the measured voltage values.

The waveform traces 140 and 142 have peaks 144 and valleys 146 that are a result of the frequency response of the various segments that make up the loaded line, i.e. the twisted pair line, the load coils, and the missing or shorted load coil or coils. The number of peaks and valleys produced in the acquired data is related to the number of functioning load coils in the line.

The controller 128, operating under programmed instructions stored in memory 130, models twisted pair transmission line load patterns for each wire gauge and at each discrete frequency tone using stored parameters of the ABCD two-port transmission line model segments. Separate segment model parameters are stored for each of the wire gauges and discrete frequency tone combinations. The two-port transmission line model segments are concatenated as previously described to produce line section models that are concatenated to produce transmission line models having some combination of load coils with or without missing or shorted load. The controller 128 processes the resultant transmission line model parameters to produce impedance values for each of the wire gauge/frequency tone combination. The controller 128 further processes the impedance values in combination with the resistive values of resistors 106 and 108 and the tone signal generator 104 voltage output to produce voltage magnitude values representative of the impedance of the modeled transmission lines. The acquired voltage values from the twisted pair transmission line under test and the voltage values generated from the twisted pair transmission line models are processed by the controller 128 to identify the modeled twisted pair transmission line that characterizes the loading pattern of the measured telecommunications transmission line.

Figure 6:
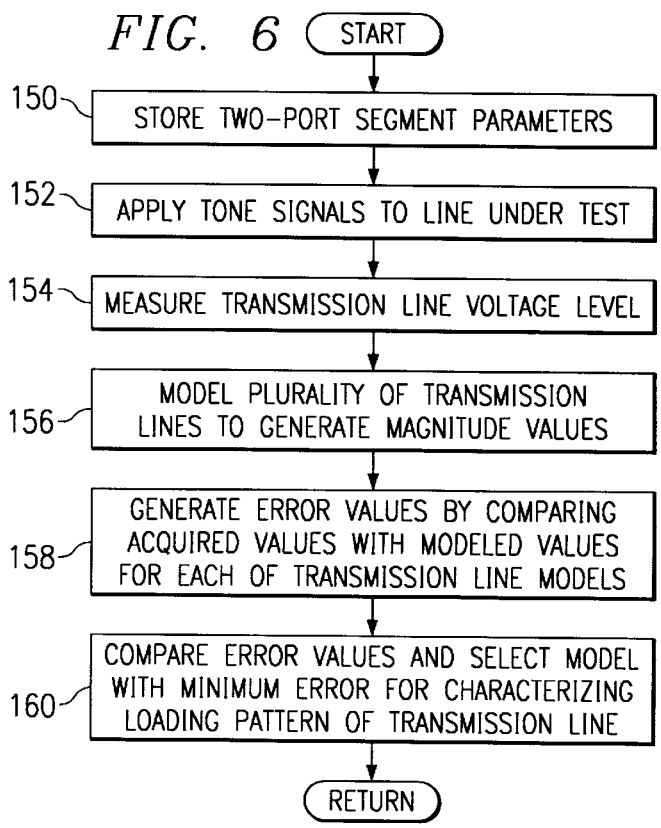
FIG. 6 is a flow chart illustrating the basic steps in the method for characterizing the loading pattern of a telecommunications transmission line according to the present invention.

Referring to FIG. 6, there is shown a flow chart illustrating the basic steps in the method of identifying the modeled twisted pair transmission line that characterizes the loading pattern of the measured telecommunications transmission line. Initially, two-port transmission line model parameters are stored for transmission line segments at the various combinations of wire gauges and tone frequencies as represented in step 150. The tone signal generator 104 applies a sequence of frequency tones to the twisted pair transmission line under test 102 as represented by step 152. In the preferred embodiment, 128 discrete tones are applied to the line under test. The measurement receiver 116 measures the voltage magnitude at nodes 122 and 124 as represented by step 154, which represents the impedance of the line under test. The controller 128 models a plurality of transmission lines using the two-port transmission line model parameters previously stored as represented in step 156. In producing the transmission line models, line segment parameters are concatenated to produce line section parameters, which are further concatenated to produce the parameters of a particular transmission line model at a particular frequency tone and wire gauge. The parameters of the particular transmission line model are processed to generate an impedance value that is further processed to produce a voltage magnitude value at the particular frequency tone. Additional voltage magnitude values are produced for each of the frequency tones produced by the tone signal generator. Error values are generated for each of the respective model by comparing the acquired voltage magnitudes at each tone with the corresponding voltage magnitudes generated using the various transmission line models as represented in step 158. The error values may be generated in a number of different ways. One way is to produce an RMS error value for each modeled transmission line by using the averaged normalized ratio of the acquired voltage magnitude values versus the respective voltage magnitude values of the various modeled transmission lines. Another way is to determine an average difference error value for each of the modeled transmission lines by determining the difference of the respective acquired voltage magnitude values and the modeled voltage magnitude values and averaging the difference values. The error values are compared to each other and the transmission line model with the minimum error value is used as the modeled telecommunications transmission line that characterizes the loading pattern of the measured telecommunications transmission line as represented in step 160.

Figure 7:
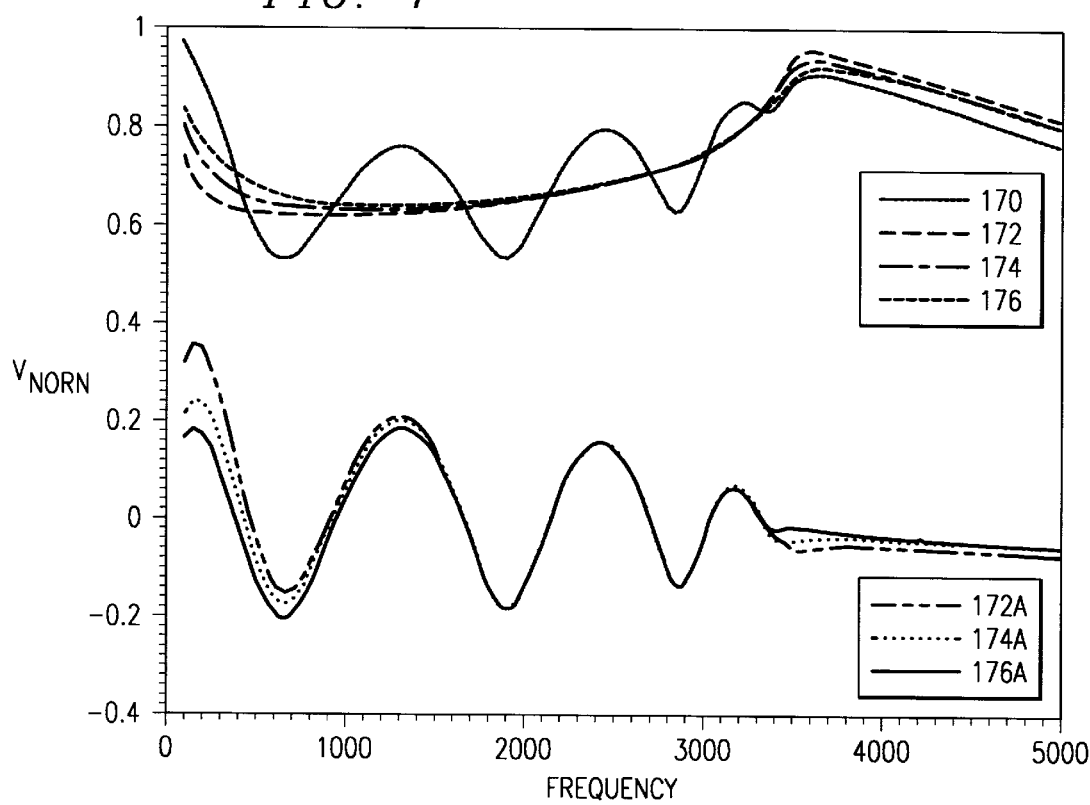
FIG. 7 shows waveform traces of acquired and modeled baseline telecommunications transmission lines and resulting waveforms from the comparison of the acquired and modeled transmission lines in the method for characterizing the loading pattern of a telecommunications transmission line according to the present invention.

While the above described method can successfully characterize the loading pattern of a telecommunications transmission line, it requires substantial processing time to generate the various models and perform the comparison at each of the discrete frequency tones. In the preferred embodiment of the invention, additional steps are performed to facilitate improved performance. One of the primary functions of the additional steps is to reduce the number of transmission line models requiring detailed analysis. To that end, two-port transmission line model parameters are stored in memory 130 for baseline telecommunications transmission line models at the various wire gauges and discrete frequency tones. The baseline telecommunications transmission line models represent infinitely long transmission lines with load coils at the nominal 6,000 feet spacing. In the preferred embodiment, thirty-six load coils are used in the models. The number of load coils in the models are not limited to thirty-six and other baseline transmission line models having a different load coil count may be used so long as the number of load coils used smooths out the baseline transmission line model data. FIG. 7 shows magnitude values of a normalized waveform trace of a 4 load coil, 24 gauge telecommunications transmission line 170 and magnitude values of modeled baseline telecommunications transmission lines 172, 174 and 176 at respective wire gauges of 19 AWG, 22 AWG and 24 AWG. The magnitude values of the measured transmission line and the magnitude values of the various modeled baseline transmission line data are compared at selected frequencies according the following equation to produce normalized voltage magnitude values.

$$V_{norm_i} = (V_{meas_i}/V_{model_i}) - 1 \qquad (22)$$

The resultant waveform traces 172A, 174A and 176A for the respective wire gauges of 19 AWG, 22 AWG and 24 AWG show that the waveform trace 176A for the 24 gauge wire has the minimum offset or error with the acquired magnitude values. In the preferred embodiment of the invention, the minimum offset or error is determined mathematically by calculating the RMS error value between the acquired magnitude values using the normalized voltage magnitude values according to the following equation.

$$\text{RMS error} = \sqrt{\frac{1}{N}\sum_{i=1}^{N}(V_{norm_i} - V_{avg})^2} \qquad (23)$$

where $V_{avg}$ is defined by the following equation.

$$V_{avg} = \frac{1}{N}\sum_{i=1}^{N} V_{norm_i} \qquad (24)$$

The error value may also be mathematically determined by calculating the deviation or difference between the acquired voltage magnitude values at the selected frequency tones and the corresponding voltage magnitude values of the modeled baseline transmission lines. The difference values for each model are averaged together to generate the error value for each modeled baseline transmission line.

Figure 8A:
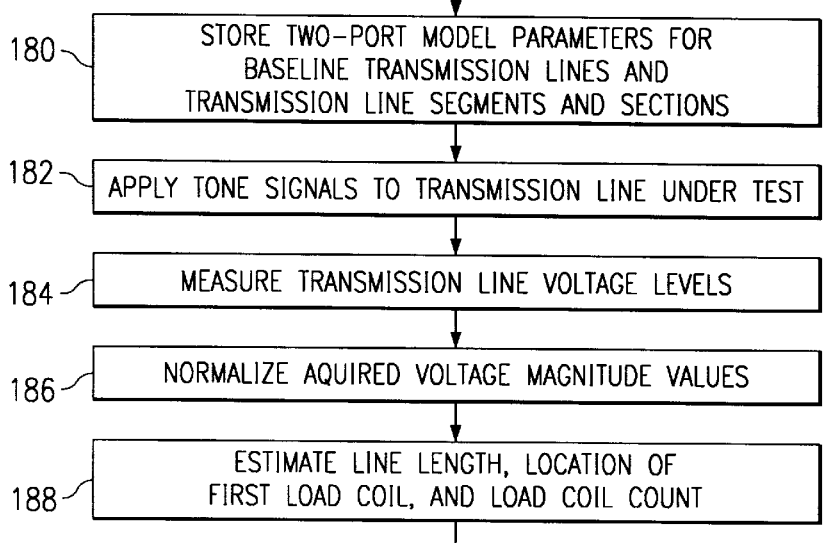
FIGS. 8A and 8B are a flow chart illustrating the preferred embodiment for characterizing the loading pattern of a telecommunications transmission line according to the present invention.

Referring to FIG. 8A, there is shown a flow chart illustrating the steps in the preferred method of characterizing the loading pattern of a telecommunications transmission line. In the preferred method two-port transmission line model parameters for baseline transmission line and transmission line segments and sections are stored for various combinations of wire gauges and tone frequencies as represented in step 180. The transmission line sections represent the various transmission line loading patterns from a single coil section, (i.e. 3000 feet of line, a load coil and 3000 feet of line) to twelve or more load coil sections. These sections are concatenated with one or more open or missing load coil sections to produce the parameters for the transmission line models. The baseline transmission lines represent infinitely long loaded transmission lines.

As in the basic method, discrete frequency tones are applied to the transmission line under test 102 from the tone signal generator 104 and the voltage level on the transmission line 102 is measured as represented by the respective steps 182 and 184. The voltage magnitude levels on the transmission line are digitized, as previously described, and then normalized as represented by step 186. The location of the first load coil and the length of the transmission line is estimated using the acquired magnitude values. The magnitude value of a moderately high discrete frequency tone (e.g. 4010 Hz) is used to estimate the beginning length of the transmission line under test 102 to the first load coil. The magnitude value at the lowest discrete frequency tone is used to estimate the line length. The difference in the line length minus the beginning length of the transmission line to the first load coil divided by the nominal spacing between load coils gives an estimate of the number of load coils that should be present in the line. The load coil estimate establishes a range over which transmission line models are generated. For example, if the number of load coils in the line under test is 8, based on the first load coil position and line length, then transmission line models for loading patterns from 6 to 10 load coils are generated for comparisons with the acquired data The estimating of the line length, location of the first load coil and the load coil count is represented in step 188.

Magnitude values at the discrete frequency tones for the various wire gauges of the baseline transmission lines are generated using the two-port transmission line model parameters as represented in step 190. For each wire gauge and discrete frequency tone an impedance value is generated using the two-port transmission line model for that gauge and frequency. The impedance value is applied to an acquisition circuit model corresponding to the component values of the tone generator 104, resistors 106 and 108 and capacitors 110 and 112. The resultant voltage divider network produces a magnitude value corresponding to node junctions 122 and 124 of the load pattern characterization apparatus 100.

Error values are calculated for each of the baseline transmission line modeled by comparing the acquired magnitude value to the baseline magnitude values as represented by step 192. Referring to FIG. 9, there is shown a set of specific steps in calculating the error values for each of the baseline transmission line models. Deviation values are calculated for each of the acquired and baseline modeled magnitude values at the discrete frequency tones using Equation 22 as represented by step 210. Each of the resultant normalized deviation values for each discrete frequency tone is compared to an empirically derived threshold value as represented by step 212. In the preferred embodiment of the invention, the threshold value 0.7, which is used for the various normalized deviation value comparisons of the baseline transmission models. As previously described, the deviation values may also be calculated by determining the difference between the acquired and modeled magnitude values. If any deviation value associated with any model exceeds the threshold, as represented by decision step 214, the model is immediately rejected and a new baseline transmission line model using a different wire gauge is initiated. If the deviation values are within the threshold value, an RMS error value is generated for the baseline transmission line model using Equation 23 as represented by step 216. An RMS error is generated for each of the baseline transmission line models that is within the threshold value as represented by decision step 218. The RMS error values are compared to each other to determine the baseline transmission line model with the minimum RMS error. The wire gauge associated with the baseline transmission model is used as the initial estimated wire gauge of the transmission line under test 102 as represented by step 194 in FIG. 8B.

The baseline transmission line model associated with the estimated wire gauge is used to estimate the location of the first missing load coil in the transmission line under test as represented by step 196. The flow chart of FIG. 10 illustrates the specific steps in estimating the first missing load coil. In step 188 of FIG. 8A, an estimate was made as to the location of the first missing load coil and the number of load coils in the line under test using the magnitude values of the initial and the moderately high discrete frequency tones. Using this information, load coils parameters are established for estimating the location of the first missing load coil as represented in step 220. For example, if the estimated first load coil is at 3,000 feet and the load coil count is 8, then the load coil parameters would be set to cover a range from 1 to 9 or 10 load coils. A baseline missing load coil transmission line model is generated by concatenating line length, missing load coil, and load coil segments to the baseline transmission line model using the estimated wire gauge for segment elements and the baseline transmission line. Deviation values are calculated between the acquired magnitude values and each of the baseline missing load coil transmission line models using equation 22 as shown by step 222. The deviation values for each of the models are compared against the threshold value, previously described as represented by step 224. If any of the deviation values for a model exceed the threshold value, the processing of the model is terminated and a new model with the missing load coil at a new position is initiated as indicated by decision step 226. An RMS error value is generated for each of the baseline missing load coil models using equation 23 where the deviation values fall within the threshold value as represented by step 228. Baseline missing load coil transmission line models are generated over the range of the load coil parameters as indicated by decision step 230. The baseline missing load coil transmission line model with the minimum RMS error value is selected as the model representing the location of the first missing load coil in the transmission line under test as represented by step 232.

Figure 12:
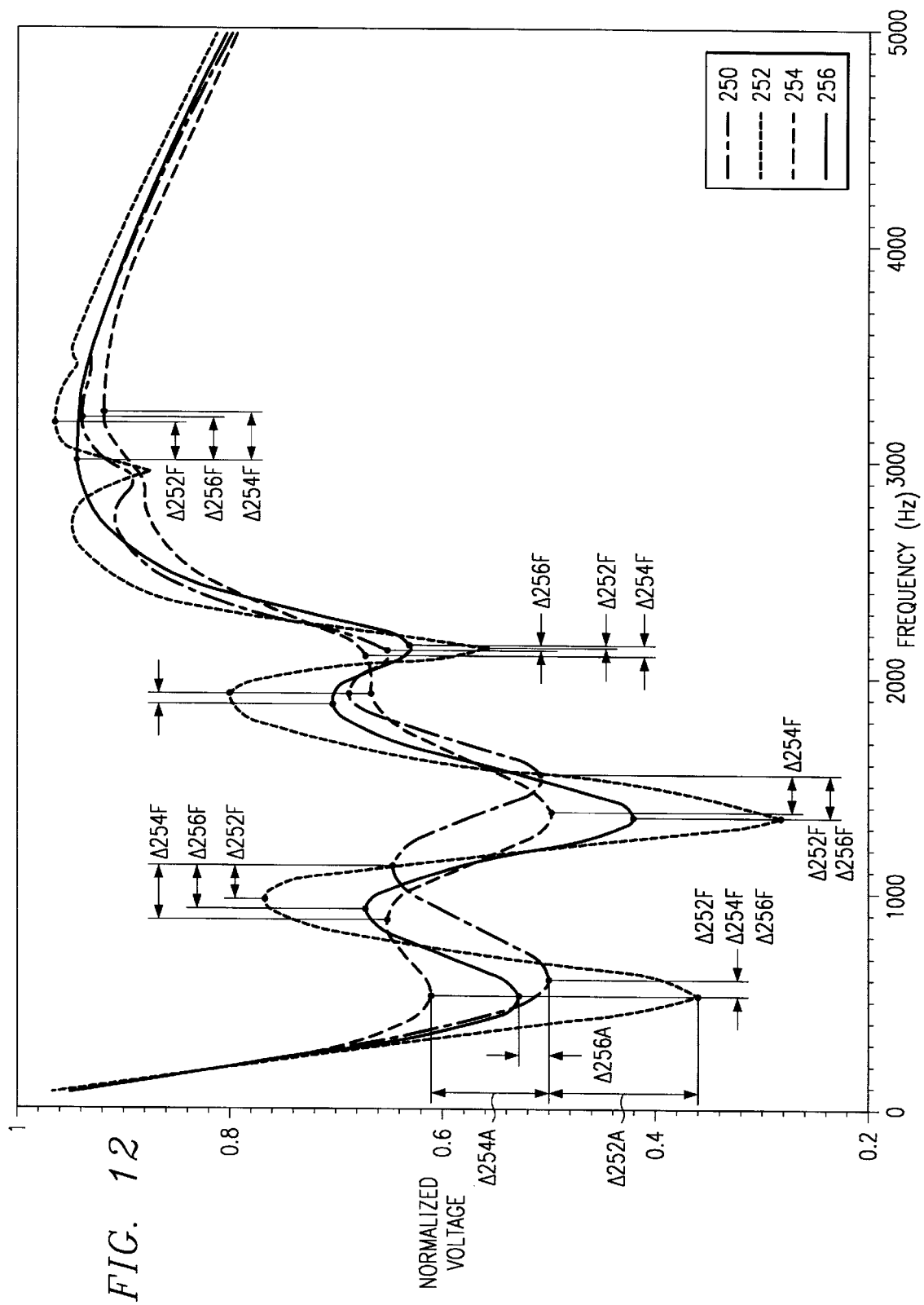
FIG. 12 illustrates representative waveform traces of acquired magnitude values and modeled magnitude values of transmission lines with different wire gauges in the method for characterizing the loading pattern of a telecommunications transmission line according to the present invention.

The next step in characterizing the loading pattern of a telecommunications transmission line is to model the telecommunications transmission line using the two-port transmission line segments or sections parameters. As previously described, the segments or sections are concatenated to produce telecommunication transmission line models. Initially, transmission line models are generated using the estimated location of the first missing load coil at various wire gauges to recheck the wire gauge as represented in step 198 in FIG. 8B. An estimate is made of the first local minimum difference value and error value for each of the transmission line models as represented in step 200. The flow chart of FIG. 11 shows the detailed steps in estimating the wire gauge using the transmission line models. The initial step is to determine the frequency of the first local minimum in the acquired magnitude values as represented by step 240. As previously described in relation to FIGS. 5A and 5B, the waveform trace of the acquired magnitude values have peaks 144 and valleys 146 related to the frequency response of the loaded line. The frequencies at which the peaks 144 and valleys 146 or maximums and minimums occur may be used as an additional filter for reducing transmission line model computation time and the number of transmission line models requiring detailed examination. FIG. 12 illustrates a waveform trace of acquired magnitude values 250 and transmission line models 252, 254 and 256 at various wire gauges. The first local minimum 250M of the acquired magnitude values has a specific magnitude value that corresponds to a discrete frequency tone generated by the tone generator 104. The transmission line models 252, 254 and 256 using different wire gauges have respective first local minimums 252M, 254M and 256M with different magnitude values associated with different frequency tones. Amplitude deviation values Δ252A, Δ254A and Δ256A are calculated between the acquired magnitude value at the local minimum 250M and the magnitude values at the local minimums 252M, 254M and 256M of the respective modeled transmission lines as represented by step 242 in FIG. 11. An RMS amplitude error value is generated for each of the wire gauge transmission line models as represented by step 244. Transmission line models for the various wire gauges are generated and tested against the acquired magnitude values are represented by decision step 246. It should be noted that not all of the wire gauges need to be tested and that narrower range of wire gauges surrounding the previously determined wire gauge may be selected. The wire gauge transmission line model with the minimum deviation value and the RMS error value is selected as the model with the correct wire gauge as represented in step 248. As can be seen from the modeled waveform traces 252, 254 and 256, the waveform trace for transmission line model 256 has the minimum amplitude deviation value Δ256A and generated the minimum RMS error value.

Figure 8B:
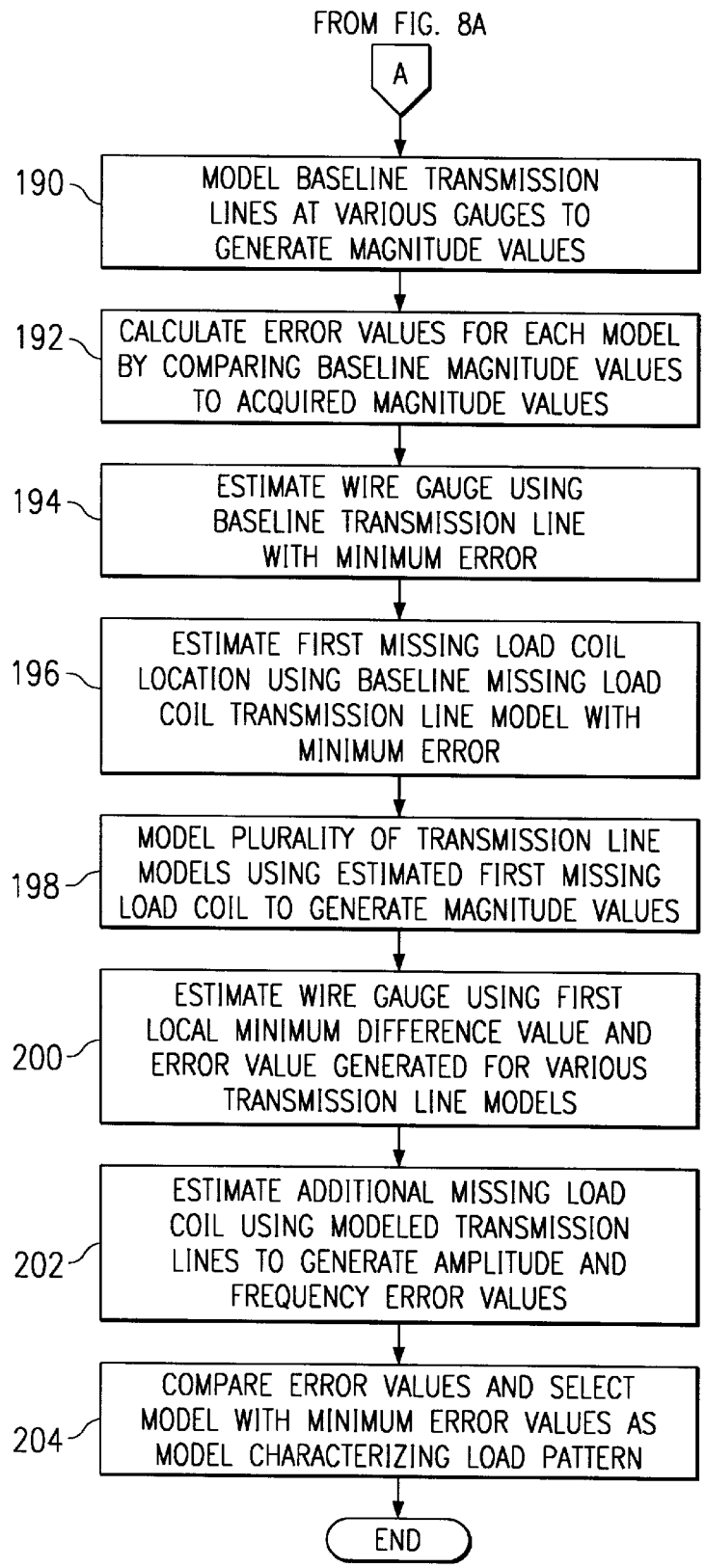

Additional missing load coils are estimated using the modeled transmission lines at the estimated wire gauge and the estimated location of the first missing load coil as represented by step 202 in FIG. 8B. In the preferred embodiment of the invention, estimation of just a second missing load coil is made. However, the step described below may be used to estimate more than two missing load coils. The number of transmission line models generated for estimating an additional missing load coil is determined by the location of the first missing load coil and the estimated load coil count. For example, if the estimated load coil count is 8 and the first missing load coil is located at the fourth load coil position, then the range of transmission line models having the additional missing load coil is between the fifth and ninth or tenth load. The flow chart of FIG. 13 shows the steps for estimating a second load coil. The initial step is to determine the frequency of the local minimums and maximums in the acquired magnitude values as represented by step 260. Amplitude and frequency deviation values are calculated between the acquired and modeled magnitude values at the local minimum and maximum frequencies as represented by step 262. The amplitude deviation values are compared to a threshold value as represented by step 264, which in the preferred embodiment of the invention is 0.17. If the amplitude deviation values at the local minimum and maximum frequencies exceed the threshold value, the current transmission line model is terminated and a new model is initiated as represented by decision step 266. For those transmission line models where the amplitude deviation values fall within the threshold value, an RMS amplitude and RMS frequency error is generated as represented by step 268. As previously stated with reference to FIG. 12, the transmission line models 252, 254 and 256 have local minimums and maximums that are different in magnitude and frequency from the acquired magnitude values. The normalized differences or deltas in the local minimum and maximum frequencies of the acquired magnitude values versus the modeled local minimum and maximum frequencies are calculated using equation 22. The RMS frequency error value and the RMS amplitude error for each model are calculated using equation 23. The range of transmission line models are generated and tested as represented by decision step 270. The first local amplitude deviation value and the RMS amplitude and frequency error values of each of the transmission line models are compared to each other and the model with values equal to or less than the a previous smallest value is selected as the transmission line model best matching the transmission line under test 102 as represented by step 204 in FIG. 8B.

It is possible that the above transmission line load pattern characterization method will reject all of the transmission line models due to anomalies in the line under test, such as water in the transmission line cable or other types of discontinuities. In such as case, a message is displayed on the display device 134 indicating that the loading pattern of the line was indeterminable.

The processing of the two port transmission line network models to produce the parameters used for generating the impedance values and the subsequent voltage magnitude values may be performed in more than one way. For example, all of the voltage magnitude values at the selected frequency tones for a particular model may be generated prior to determining the error values and comparing with the threshold value. However, it is more efficient and the preferred method to determine the modeled voltage magnitude value at a selected frequency tone for a particular model, determine the deviation value and compare the value to the threshold prior to determining the next modeled voltage magnitude value for the model. If the threshold test fails, the model is rejected and no additional voltage magnitude values need to be generated. This reduces the processing time needed to identify on the correct transmission line model that characterizes the loading pattern of the transmission line under test.

An apparatus and method have been described for characterizing the loading pattern of a telecommunications transmission line. A frequency tone generator produces discrete frequency tones that are applied to a transmission line under test. A measurement receiver having voltage divider circuitry that includes the impedance of the line under test measures the voltage on the line. A controller, operating under program control, models a plurality of transmission lines and baseline transmission lines using parameters of two-port transmission line network models to generate voltage magnitude values at the discrete frequency tones. Error values are determined between the acquired magnitude voltage values and the modeled magnitude voltage values. In one implementation of the invention, average difference values are calculated for each model and the model with the minimum average difference value is used for characterizing the loading pattern of the transmission line under test. In the preferred embodiment of the invention, deviation values are generated and compared to a threshold value. If any of the deviation values for a particular model exceeds the threshold value, the examination of that model is terminated and the examination of a new model is initiated. RMS amplitude error values are generated for the baseline transmission line models for estimating the wire gauge of the transmission line under test and the location of the first missing load coil in the test line. RMS amplitude and frequency error values are generated for the transmission line models to re-check the estimated wire gauge and estimate additional missing load coils in the transmission line under test. Further steps in the preferred embodiment include estimating the number of load coils in the transmission line under test by estimating the length of the transmission line. The modeling of transmission lines is then limited to a range surrounding the estimated load coil count. Another step is to determine local maximum and minimum in the acquired magnitude voltage signal at the discrete frequency tones and generate modeled magnitude voltage values at these frequencies.

It will be obvious to those having skill in the art that many changes may be made to the details of the above-described embodiments of this invention without departing from the underlying principles thereof The scope of the present invention should, therefore, be determined only by the following claims.

What is claimed is:

1. An apparatus for characterizing the loading pattern of a telecommunications transmission line comprising:

a signal generator producing a variable frequency output signal coupled to the telecommunications transmission line;

a measurement receiver coupled to the telecommunications transmission line that acquires magnitude values representative of the impedance of the telecommunications transmission line as a function of the signal generator output frequency;

means for modeling a plurality of telecommunications transmission lines to generate magnitude values representative of the impedance of the modeled telecommunications transmission lines as a function of frequency;

means for calculating an error value for each of the modeled telecommunications transmission lines by comparing the acquired magnitude values with the modeled magnitude values; and means for comparing the error values of the modeled telecommunications transmission lines to each other to determine the modeled telecommunications transmission line with the minimum error value that characterizes the loading pattern of the measured telecommunications transmission line.

2. The apparatus for characterizing the loading pattern of a telecommunications transmission line as recited in claims 1 wherein the modeling means, the calculating means and the comparing means further comprise a controller executing instructions stored in a memory device.

3. The apparatus for characterizing the loading pattern of a telecommunications transmission line as recited in claims 2 wherein the memory device contains coefficients of two-port transmission line networks representing segments of the telecommunications transmission line.

4. An apparatus for characterizing the loading pattern of a telecommunications transmission line comprising:

a signal generator producing a variable frequency output signal having a magnitude value coupled to the telecommunications transmission line;

a measurement receiver coupled to the telecommunications transmission line that acquires magnitude values representative of the impedance of the telecommunications transmission line as a function of the signal generator output frequency;

means for normalizing the acquired magnitude values by the magnitude value of the variable frequency output signal;

means for modeling a plurality of telecommunications transmission lines and a plurality of baseline telecommunications transmission lines to generate magnitude values representative of the impedance of the modeled and baseline telecommunications transmission lines as a function of frequency;

means for calculating an error value for each of the modeled and baseline telecommunications transmission lines by comparing the acquired magnitude values with the modeled and baseline magnitude values;

means for estimating a wire gauge for the telecommunications transmission line using the baseline telecommunications transmission lines having the minimum error value;

means for estimating a first missing load coil in the telecommunications transmission line by modeling baseline transmission lines with a missing load coil at various locations in the baseline transmission line at the estimated wire gauge and using the modeled baseline transmission line with the minimum error value;

means for estimating additional missing load coils in the telecommunications transmission line using the modeled telecommunications transmission lines at the estimated wire gauge and the estimated location of the first missing load coil; and means for comparing the error values of the modeled telecommunications transmission lines with the estimated additional missing load coils to each other to determine the modeled telecommunications transmission line with the minimum error value that characterizes the loading pattern of the measured telecommunications transmission line.

5. The apparatus for characterizing the loading pattern of a telecommunications transmission line as recited in claims 4 wherein the calculating means generates an RMS error value for each of the modeled and baseline telecommunications transmission lines using ratio values derived from the acquired magnitude values divided by the magnitude values of the respective modeled and baseline telecommunications transmission lines at common frequency values.

6. The apparatus for characterizing the loading pattern of a telecommunications transmission line as recited in claims 5 further comprising an additional comparing means that compares the ratio values of the respectively modeled baseline telecommunications transmission lines to a threshold value to select modeled baseline telecommunications transmission lines that may characterize the loading pattern of the measured telecommunications transmission line.

7. The apparatus for characterizing the loading pattern of a telecommunications transmission line as recited in claims 4 wherein the calculating means generates an average difference error value for each of the modeled and baseline telecommunications transmission lines using difference values derived by the difference between the acquired magnitude values and the magnitude values of the modeled and the baseline telecommunications transmission lines at common frequency values.

8. The apparatus for characterizing the loading pattern of a telecommunications transmission line as recited in claims 4 further comprising an additional comparing means that compares the difference values of the respectively modeled telecommunications transmission lines to a threshold value to select modeled telecommunications transmission lines that may characterize the loading pattern of the measured telecommunications transmission line.

9. The apparatus for characterizing the loading pattern of a telecommunications transmission line as recited in claims 4 wherein the normalizing means, the modeling means, the calculating means, the various estimating means and the comparing means further comprise a controller executing instructions stored in a memory device.

10. The apparatus for characterizing the loading pattern of a telecommunications transmission line as recited in claims 4 wherein the memory device contains coefficients of a plurality of two-port transmission line network models at selected frequencies and wire gauges representing segments of the telecommunications transmission line and baseline telecommunications transmission lines.

11. The apparatus for characterizing the loading pattern of a telecommunications transmission line as recited in claim 10 wherein the coefficients of the plurality of two-port transmission line networks representing the baseline telecommunications transmission lines models at various wire gauges have a plurality of load coils with the plurality of load coils being in the range of thirty-six load coils.

12. A method of characterizing the loading pattern of a telecommunications transmission line comprising the steps of:
 a) applying a variable frequency signal to the telecommunications transmission line;
 b) acquiring magnitude values representative of the impedance of the telecommunications transmission line as a function of the variable frequency signal;
 c) modeling a plurality of telecommunications transmission lines to generate magnitude values representative of the impedance of the modeled telecommunications transmission lines as a function of frequency;
 d) calculating an error value for each of the modeled telecommunications transmission lines by comparing the acquired magnitude values with the modeled magnitude values; and
 e) comparing the error values of the modeled telecommunications transmission lines to each other to determine the modeled telecommunications transmission line with the minimum error value that characterizes the loading pattern of the measured telecommunications transmission line.

13. The method of characterizing the loading pattern of a telecommunications transmission line as recited in claim 12 wherein an initial step comprises storing coefficients of a plurality of two-port transmission line network models at selected frequencies and transmission line wire gauges that represents segments of the telecommunications transmission.

14. The method of characterizing the loading pattern of a telecommunications transmission line as recited in claim 11 wherein the modeling step comprises the steps of:
 a) concatenating multiple two-port transmission line model segments to generate coefficients that model a plurality of sections of the telecommunications transmission line;
 b) concatenating multiple two-port transmission line model sections to generate coefficients that model a plurality of telecommunication transmission lines;
 c) generating impedance values as a function of frequency using the plurality of two port transmission line network models; and
 d) generating magnitude values representative of the impedance of the modeled telecommunications transmission lines as a function of the generated impedance values.

15. The method of characterizing the loading pattern of a telecommunications transmission line as recited in claim 12 wherein an initial step comprises storing coefficients of two-port transmission line network models at selected frequencies and transmission line wire gauges that represents sections of the telecommunications transmission line.

16. The method of characterizing the loading pattern of a telecommunications transmission line as recited in claim 15 wherein the modeling step comprises the steps of:
 a) concatenating multiple two-port transmission line model sections to generate coefficients that model a plurality of telecommunication transmission lines;
 b) generating impedance values as a function of frequency using the plurality of two port transmission line network models; and
 c) generating magnitude values representative of the impedance of the modeled telecommunications transmission lines as a function of the generated impedance values.

17. The method of characterizing the loading pattern of a telecommunications transmission line as recited in claim 16 wherein the variable frequency signal has a magnitude and the acquiring magnitude value step further comprises the step of normalizing the acquired magnitude values as a function of the magnitude of the variable frequency signal.

18. A method of characterizing the loading pattern of a telecommunications transmission line comprising the steps of:
 a) applying a variable frequency signal having a magnitude value to the telecommunications transmission line;
 b) acquiring magnitude values representative of the impedance of the telecommunications transmission line as a function of the variable frequency signal;
 c) normalizing the acquired magnitude values as a function of the magnitude of the variable frequency signal;
 d) modeling a plurality of baseline telecommunications transmission lines to generate magnitude values representative of the impedance of the baseline telecommunications transmission lines as a function of frequency;
 e) calculating an error value for each of the baseline telecommunications transmission lines by comparing the acquired magnitude values with the baseline magnitude values;
 f) estimating a wire gauge for the telecommunications transmission line using the baseline telecommunications transmission line having the minimum error value;
 g) estimating a first missing load coil in the telecommunications transmission line by modeling baseline transmission lines with a missing load coil at various locations in the baseline telecommunications transmission line at the estimated wire and using the baseline missing load coil transmission line model with the minimum error value;
 h) modeling a plurality of telecommunications transmission lines using the estimated wire gauge and the estimated location of the first missing load coil to generate magnitude values representative of the impedance of the modeled telecommunications transmission lines as a function of frequency;
 i) estimating the wire gauge by calculating a difference value between a first local minimum magnitude value in the acquired magnitude values and the corresponding magnitude value for each of the modeled telecommunications transmission lines and using the modeled telecommunications transmission line with the minimum difference value;

j) estimating additional missing load coils in the telecommunications transmission line using the modeled telecommunications transmission lines at the estimated wire gauge and the estimated location of the first missing load coil to generate amplitude and frequency error values; and k) comparing the error values of the modeled telecommunications transmission lines with the estimated additional missing load coils to each other to determine the modeled telecommunications transmission line with the minimum error value that characterizes the loading pattern of the measured telecommunications transmission line.

19. The method of characterizing the loading pattern of a telecommunications transmission line as recited in claim 18 wherein an initial step comprises storing coefficients of a plurality of two-port transmission line network models at selected frequencies and transmission line wire gauges that represents baseline telecommunications transmission lines and segments of the telecommunications transmission line.

20. The method of characterizing the loading pattern of a telecommunications transmission line as recited in claim 19 wherein the modeling step further comprises initial steps of:

a) estimating a beginning length for the transmission line as a function of the acquired magnitude value at a moderately high acquired frequency; and b) estimating a length for the transmission line as a function of the acquired magnitude value at the lowest acquired frequency.

21. The method of characterizing the loading pattern of a telecommunications transmission line as recited in claim 20 further comprising the step of estimating a load coil count for the transmission line that represents the estimated number of load coils in the transmission line using the estimated length of the transmission line.

22. The method of characterizing the loading pattern of a telecommunications transmission line as recited in claim 21 wherein the baseline transmission line modeling step further comprises the steps of:

a) generating impedance values as a function of frequency using the plurality of two port transmission line network models; and b) generating magnitude values representative of the impedance of the baseline telecommunications transmission lines as a function of the generated impedance values.

23. The method of characterizing the loading pattern of a telecommunications transmission line as recited in claim 22 wherein the baseline transmission line error value calculating step further comprises the steps of:

a) calculating deviation values between the acquired magnitude values and the baseline magnitude values for each of the modeled baseline telecommunications transmission lines;

b) comparing the deviation values to a threshold value to select modeled baseline telecommunications transmission lines that may represent a correct wire gauge for the telecommunications transmission line;

c) generating an RMS error value for each of the selected modeled baseline telecommunications transmission lines using averaged normalized ratio values derived from the acquired magnitude values divided by the magnitude values of the respective modeled baseline telecommunications transmission lines at common frequency values.

24. The method of characterizing the loading pattern of a telecommunications transmission line as recited in claim 23 wherein the deviation value calculating step further comprises the step of normalizing the acquired magnitude values by the magnitude values of the respective modeled baseline telecommunications transmission lines at common frequency values.

25. The method of characterizing the loading pattern of a telecommunications transmission line as recited in claim 23 wherein the deviation value calculating step further comprises the step of determining the difference between the acquired magnitude values and the magnitude values of the respective modeled baseline telecommunications transmission lines at common frequency values.

26. The method of characterizing the loading pattern of a telecommunications transmission line as recited in claim 23 wherein the first missing load coil estimating step further comprises the steps of:

a) establishing load coil parameters for the first missing load coil position using the respective beginning length of the telecommunications transmission line and the load coil count;

b) calculating deviation values between the acquired magnitude values and the baseline magnitude values for each of the modeled baseline missing load coil telecommunications transmission lines within the load coil parameters;

b) comparing the deviation values to a threshold value to select modeled baseline missing load coil telecommunications transmission lines that may represent the correct location of the missing load coil;

c) generating an RMS error value for each of the selected modeled baseline missing load coil telecommunications transmission lines using averaged normalized ratio values derived from the acquired magnitude values divided by the magnitude values of the respective modeled baseline missing load coil telecommunications transmission lines at common frequency values; and d) selecting the modeled baseline missing load coil telecommunications transmission line model with the minimum RMS error as representing the location of the first missing load coil.

27. The method of characterizing the loading pattern of a telecommunications transmission line as recited in claim 26 wherein the first missing load coil estimating step further comprises the steps of:

a) calculating deviation values between the acquired magnitude values and the baseline magnitude values for each of the modeled baseline missing load coil telecommunications transmission lines at various wire gauges;

b) comparing the deviation values to a threshold value to select the modeled baseline missing load coil telecommunications transmission lines that may represent the correct wire gauge;

c) generating an RMS error value for each of the selected modeled baseline missing load coil telecommunications transmission lines using averaged normalized ratio values derived from the acquired magnitude values divided by the magnitude values of the respective modeled baseline missing load coil telecommunications transmission lines at common frequency values; and d) selecting the modeled baseline missing load coil telecommunications transmission line model with the minimum RMS error as having the correct wire gauge.

28. The method of characterizing the loading pattern of a telecommunications transmission line as recited in claim 27 wherein the telecommunications transmission line modeling step further comprises the steps of:
   a) concatenating multiple two-port transmission line model segments to generate coefficients that model a plurality of sections of the telecommunications transmission line;
   b) concatenating multiple two-port transmission line model sections to generate coefficients that model a plurality of telecommunication transmission lines;
   c) generating impedance values as a function of frequency using the plurality of two port transmission line network models; and
   d) generating magnitude values representative of the impedance of the modeled telecommunications transmission lines as a function of the generated impedance values.

29. The method of characterizing the loading pattern of a telecommunications transmission line as recited in claim 28 wherein the estimating wire gauge step further comprises the steps of:
   a) determining a frequency of a local minimum value in the acquired magnitude values;
   b) calculating deviation values between the acquired magnitude value at the local minimum frequency and the corresponding magnitude value for each of the modeled telecommunications transmission lines at the various gauges;
   d) generating an RMS amplitude error value for each of the modeled telecommunications transmission lines using averaged normalized ratio values derived from the acquired magnitude values divided by the magnitude values of the respective modeled telecommunications transmission lines at common frequency values; and
   f) selecting the modeled telecommunications transmission line model with the minimum first local minimum deviation values and RMS amplitude error values as having the correct wire gauge.

30. The method of characterizing the loading pattern of a telecommunications transmission line as recited in claim 29 wherein the estimating additional missing load coil step further comprises the steps of:
   a) determining frequencies of local minimum and maximum magnitude value in the acquired magnitude values;
   b) calculating deviation values between the magnitude values in the acquired magnitude values at the local minimum and maximum frequencies and the corresponding magnitude value for each of the modeled telecommunications transmission lines;
   c) comparing the deviation values to a threshold value to select the modeled telecommunications transmission lines that may represent the correct modeled transmission line with additional missing load coils;
   d) generating an RMS amplitude error value for each of the modeled telecommunications transmission lines using averaged normalized ratio values derived from the acquired magnitude values divided by the magnitude values of the respective modeled telecommunications transmission lines at common frequency values;
   e) generating an RMS frequency error value for each of the modeled telecommunications transmission lines using averaged normalized ratio values derived from the frequency difference between the local minimum and maximum acquired magnitude values and corresponding minimum and maximum magnitude values of the modeled telecommunications transmission lines; and
   f) comparing the first local minimum deviation values, RMS amplitude and RMS frequency error values of the modeled telecommunications transmission lines with the estimated additional load coil to each other to determine the modeled telecommunications transmission line with the minimum first local minimum difference value, RMS amplitude and RMS frequency value that characterizes the loading pattern of the measured telecommunications transmission line.

31. The method of characterizing the loading pattern of a telecommunications transmission line as recited in claim 30 wherein the deviation value calculating step further comprises the step of normalizing the local minimum and maximum acquired magnitude values by the corresponding magnitude values of the respective modeled telecommunications transmission lines at common frequency values.

32. The method of characterizing the loading pattern of a telecommunications transmission line as recited in claim 30 wherein the deviation value calculating step further comprises the step of determining the difference between the local minimum and maximum acquired magnitude values and the corresponding magnitude values of the respective modeled telecommunications transmission lines at common frequency values.

* * * * *